United States Patent [19]

Röhrich et al.

[11] Patent Number: 4,722,001
[45] Date of Patent: Jan. 26, 1988

[54] SELF-PROPELLED INSPECTION VEHICLE

[75] Inventors: Heinz Röhrich, Nürnberg; Clemens Dippold, Bamberg; Georg Gebald, Kirchehrenbach, all of Fed. Rep. of Germany

[73] Assignee: Kraftwerk Union Aktiengesellschaft, Mülheim/Ruhr, Fed. Rep. of Germany

[21] Appl. No.: 733,531

[22] Filed: May 13, 1985

[30] Foreign Application Priority Data

May 14, 1984 [DE] Fed. Rep. of Germany ....... 3417865

[51] Int. Cl.$^4$ ............................................. H04N 7/18
[52] U.S. Cl. ..................................... 358/100; 358/99; 104/13; 324/220
[58] Field of Search ..................... 358/100, 99; 73/623, 73/622; 324/220, 221; 346/33 P; 352/131, 132; 378/59, 60; 104/13 G; 250/538 P

[56] References Cited

U.S. PATENT DOCUMENTS 4,006,359  2/1977  Sullins et al. .................. 104/138 G
4,272,781  6/1981  Taguchi et al. .................... 358/100
4,537,136  8/1985  Douglas .......................... 104/138 G
4,560,931  12/1985  Murakami et al. .................. 324/220

Primary Examiner—Howard W. Britton
Assistant Examiner—John K. Peng
Attorney, Agent, or Firm—Herbert L. Lerner; Laurence A. Greenberg

[57] ABSTRACT

A self-propelled inspection vehicle for piping systems includes a vehicle body in the form of a rigid, tightly-sealed housing having forward and rearward end faces as seen in a given insertion direction of the vehicle into the piping, a power supply disposed in the housing, a propulsion mechanism for resiliently bracing the housing against the inner surface of the piping, at least one motor connected to the power supply and to the propulsion mechanism for driving the propulsion mechanism, a television camera optical system having a given field of view being supported on the forward end face of the housing, and at least one light source associated with the given field of view being supported on the forward end face of the housing.

20 Claims, 2 Drawing Figures

SELF-PROPELLED INSPECTION VEHICLE

BACKGROUND OF THE INVENTION

1. Field of the Invention

The invention relates to a self-propelled inspection vehicle for piping installations, including a vehicle body and a propulsion mechanism resiliently bracing the vehicle body against the inside surface of the pipe.

2. Description of the Prior Art

A self-propelled inspection vehicle which is known in the prior art is constructed as an equipment carrier and is braced by several wheels against the inside wall surface of a pipe to be inspected. In this conventional inspection vehicle, the length of the vehicle body is several times the inside diameter of the pipe to be negotiated. The vehicle body is constructed as an articulated support body with gimbal action, so that narrow pipe elbows can also be travelled. In this self-propelled inspection vehicle, the drive energy must be supplied through a cable which must be dragged along. It is inherent in this inspection vehicle that its range of action is limited already because of the friction resistance of the cable to be dragged along on the walls of the pipe. The friction increases with increasing distance from the starting point. This friction force increases especially after negotiating several pipe elbows or if the inspection vehicle must negotiate vertical pipe sections and then must also lift the weight of the vertically hanging section of the cable, besides its own weight and the friction resistance of the cable to be dragged along.

SUMMARY OF THE INVENTION

It is accordingly an object on the invention to provide a self-propelled inspection vehicle for the inside surfaces of piping installations, which overcomes the hereinafore-mentioned disadvantage of the heretofore-known devices of this general type, and which has a range which is distinctly larger than that of known inspection and repair vehicles.

With the foregoing and other objects in view there is provided, in accordance with the invention, a self-propelled inspection vehicle for piping systems, comprising a vehicle body in the form of a rigid, tightly-sealed housing having forward and rearward end faces as seen in a given insertion direction of the vehicle into the piping, a power supply disposed in the housing, a propulsion mechanism for resiliently bracing the housing against the inner surface of the piping, at least one motor connected to the power supply and to the propulsion mechanism for driving the propulsion mechanism, a television camera with an optical system having a given field of view being supported on the forward end face of the housing, and at least one light source associated with the given field of view being supported on the forward end face of the housing.

In accordance with another feature of the invention, the housing has an axis of symmetry aligned with the axis of the piping, and the propulsion mechanism includes at least three wheels mutually offset by at most 120° about the axis of symmetry.

In accordance with a further feature of the invention, the propulsion mechanism includes a plurality of driven wheels and a non-driven distance feeler wheel.

In accordance with an added feature of the invention, the at least one motor is in the form of a plurality of motors each being connected to a respective one of the driven wheels.

In accordance with an additional feature of the invention, the power supply is a battery.

In accordance with again another feature of the invention, the housing is water-tightly encapsulated.

In accordance with again a further feature of the invention, the at least one motor is water-tightly encapsulated.

In accordance with again an added feature of the invention, there is provided a video recorder disposed in the housing and connected to the television camera optical system for storing the television pictures in the housing.

In accordance with again an additional feature of the invention, there is provided a thin signal cable connected to the housing for transmitting data.

In accordance with yet another feature of the invention, there are provided detectors disposed on the forward end face of the housing being matched to the light source and aligned with a pipe wall illuminated by the light source for timely detection of substantial cross-sectional changes in the pipe wall, such as inflow openings and T-sections.

In accordance with yet a further feature of the invention, there are provided means such as a control logic connected to the detectors for reversing direction of the vehicle.

In accordance with yet an added feature of the invention, there is provided at least one sensor connected to the housing for detecting obstacles.

In accordance with yet an additional feature of the invention, the housing has an axis of symmetry, and the sensor is a shut-off frame having an outer contour disposed several millimeters from the inner surface of the piping, the shut-off frame being supported on the forward end face perpendicular to the axis of symmetry and resilient in direction along the axis of symmetry.

In accordance with still another feature of the invention, the sensor includes an acoustical transmitting and receiving system.

In accordance with still a further feature of the invention, there is provided a switching device connected to the sensor for reversing propulsion direction of the vehicle.

In accordance with still an added feature of the invention, the distance feeler wheel runs on the inner surface of the piping and includes a rotary pick-up for recording at least one of the motion of the vehicle and/or the distance travelled, to be stored synchronously with a television picture.

In accordance with another feature of the invention, there is provided a switching logic connected to the rotary pick-up for reversing direction of propulsion of the vehicle upon the occurrence of a forced stop.

In accordance with a further feature of the invention, the propulsion mechanism includes shock-absorbing struts each having an end connected to a respective one of the wheels.

In accordance with an added feature of the invention, the propulsion mechanism includes springs, at least one of the springs pressing each respective strut toward the inner surface of the piping.

In accordance with again another feature of the invention, there is provided at least one hydraulic or pneumatic power cylinder connected to the struts for retracting the struts from the inner surface of the piping for insertion into a pipe end.

In accordance with again a further feature of the invention, there is provided a radio isotope disposed on the housing from outside the piping, for localizing the position of the vehicle in the piping.

In accordance with again an added feature of the invention, the distance feeler wheel runs freely on the inner surface of the piping, and including a rotary pick-up coupled to the distance feeler wheel as a measuring sensor.

In accordance with again an additional feature of the invention, there is provided an axle carrier, a photo detector fastened to the axle carrier along with and in mutual alignment with the light source, and a disc having cutouts formed therein being coupled to the freely running wheel and rotatable between the photo detector and the light source.

In accordance with yet another feature of the invention, the recorded information is faded into a television picture.

In accordance with a concomitant feature of the invention, the propulsion mechanism includes drive wheels being radially movably supported on the vehicle body together with the motor.

Freedom from a power supply cable is achieved by constructing the vehicle body as a rigid closed housing and by equipping the same with a battery as the power supply for the drive motors as well as for the repair and inspection devices. The encapsulated construction also creates the condition for carrying out inspection and repair tasks in water-filled pipe sections.

The separate pressure of the wheels individually supported on shock absorbing legs against the inside wall surface of the pipe and the use of the all-wheel drive, ensure a propulsion force sufficiently large even for vertical standpipes. The power cylinders facilitate the insertion of the self-propelled inspection vehicle into a pipe end which is open on one side, as they pull the shock absorbing legs pneumatically or hydraulically toward the vehicle body, against the force of their compression springs.

The use of a shut-off frame which is axially movable at the forward end face of the vehicle body in its axis of symmetry makes it possible to sense obstacles contained in the pipe line and to reverse the direction of travel in time.

The light sources which are brought through cutouts in the shut-off frame and/or which are fastened to the disconnect switch and are supplied by the battery, make it possible to detect obstacles with the photo detectors directed toward the wall zone immediately in front. In this manner, not only raised obstacles but also T-sections and openings of the pipe into a vessel, can be detected and used for an automatic drive reversal. Thus the vehicle can be prevented from falling into a vessel into which the pipe opens.

The television camera which is carried along together with the illuminating device and the video recorder built into the vehicle body, permit the evaluation of the inspection trip on a television monitor by means of the recordings of the video recorder, after the inspection vehicle has returned.

Other features which ae considered as characteristic for the invention are set forth in the appended claims.

Although the invention is illustrated and described herein as embodied in a self-propelled inspection vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
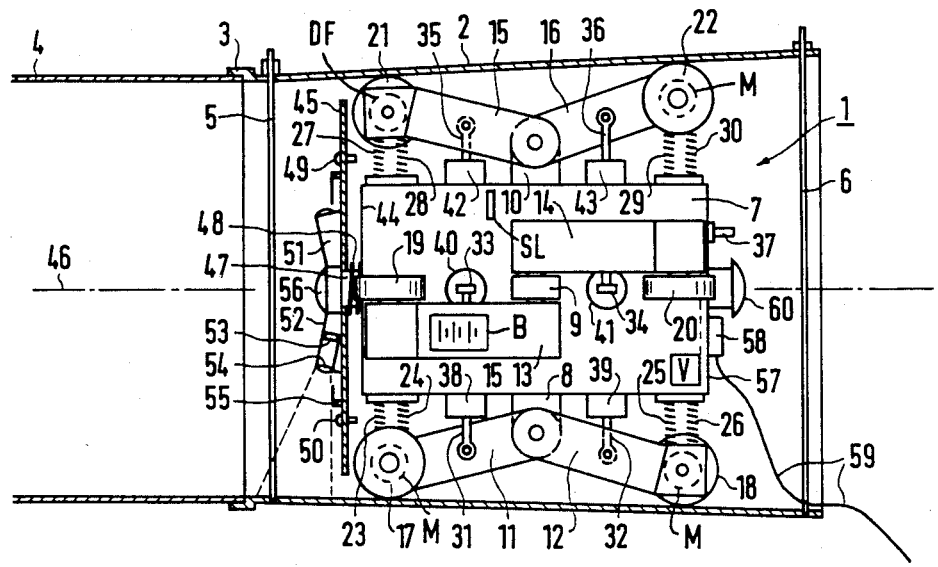
FIG. 1 is a fragmentary, diagrammatic, partly cross-sectional, side-elevational view of an inspection vehicle according to the invention, which is inserted into a funnel-shaped pipe lock.

Referring now to the figures of the drawings in detail and first, particularly, to FIG. 1 thereof, there is seen an inspection vehicle 1 according to the invention which has just been inserted into a funnel-shaped pipe lock 2. The pipe lock 2 is placed on the open end of a pipeline 4 to be inspected, by a guide ring 3. Each end of the pipe lock 2 is equipped with a shut-off slider 5, 6, respectively. A cylindrical vehicle body 7 which is water-tightly sealed on all sides thereof, carries four support eyes halfway along the length thereof, although only three support eyes 8, 9, 10 are visible. The support eyes are offset relative to each other by 90° about the periphery. Two spring or shock absorbing struts or legs 11 to 16 are linked to each of the support eyes. The free end of each leg carries a wheel 17 to 22 approximately at the extent of an end face of the vehicle body 7. In the embodiment of FIG. 1, the shock absorbing legs are pushed by compression springs 23 to 30 against the inside wall surface of the pipe line 4 and the pipe lock 2, respectively. In addition, the shock absorbing legs are each coupled with a piston rod 31 to 36 of a power cylinder 38 to 43, respectively, which can be acted upon by compressed air through a connecting nozzle 37.

DESCRIPTION OF THE PREFERRED EMBODIMENT

In the illustrated embodiment, the vehicle body 7 has an end face 44 which is in front, as seen in the insertion direction. Ahead of the end face 44, the vehicle body 7 carries a shield-like shut-off frame or sensor 45. The sensor may also be an acoustical transmitting and receiving system or a feeler or sensor wheel with a rotary pick-up for recording the motion of the vehicle and/or the distance travelled, to be recorded synchronously with a television picture. The rotary pick-up may have a switching logic SL for reversing direction. The shut-off frame 45 has a circular cross section which is 40 to 100 mm smaller than the inside diameter of the pipeline which is to be negotiated. The shut-off frame is supported along a pipe stub 47 fastened to the forward end face 44 of the vehicle body 7, coaxially to an axis of symmetry 46 of the vehicle body 7. The shut-off frame is movable through several millimeters against the force of a spring 48. A non-illustrated double-throw switch for the drive direction of the wheels 17 to 22, can be operated through motion thereof relative to the vehicle body 7.

Several light sources 49, 50 are mounted on the shut-off frame shown in FIG. 1, although only two are shown. In addition, the shut-off frame carries several photo detector housings 51, 52, only two of which are shown. Each of these housings contain a photodetector 53, the field of view of which passes through a lens 54 on a zone of the wall of the pipeline 4 directly in front of the shut-off frame 45. An aperture ring 55 fastened to the shut-off frame 45 shields the light sources 49, 50 in direction toward the photo detectors 53. A control logic may be connected to the detectors for reversing the direction of the drive upon excessive current consumption of the motors for the wheels. The optical system 56 of a non-illustrated television camera located in the vehicle body 7, is located in the pipe stub 47 which is fastened coaxially to the axis of symmetry 46 of the vehicle body 7 at its forward end face 44. A cable mounting 58 and a signal cable 59 fastened to the cable mounting, can be seen at the rearward end face 57, as seen in the insertion direction of the self-propelled inspection vehicle 1.

In addition, a buffer 60 is axially movably supported in the embodiment at the end face 57 of the vehicle body 7, which is rearward relative to the insertion direction. This buffer is coupled to a non-illustrated disconnect device for the drive and the other components of the inspection vehicle, in such a manner that they are disconnected if the buffer is pushed in.

If the pipe section or a pipeline is to be inspected by the inspection vehicle 1, a shut-off frame 45 having a diameter which is chosen several millimeters (about 75 mm) smaller than the inside width of the pipeline, is placed on the pipe stub 47 located at the forward end face of the vehicle body. The inspection vehicle is then acted upon by compressed air through the connecting stub 37. The result of this operation is that the power cylinders 38 to 43 pull the shock absorbing legs 11 to 16 toward the vehicle body 7 through the piston rods 31 to 36, against the force of the compression springs 23 to 30. The self-propelled inspection vehicle can then be inserted without further difficulty into the open pipe end. After relieving the compressed air, the wheels 17 to 22 of the inspection vehicle 1 are again pressed against the inside surface of the wall of the pipe, and the inspection vehicle is thereby centered on the axis of symmetry of the pipe to be inspected. When the inspection vehicle is switched on by pulling-out the buffer 60 located at the rear end face 57 thereof, it begins its inspection trip. It would also be possible to introduce the inspection vehicle 1 by means of a pipe lock 2 placed on the open pipe end. In this case, no compressed air is required because the wheels push the shock absorbing legs or struts back when inserted into the pipe lock which is narrowed down in funnel fashion. Elements 11–22 may be considered to be a propulsion mechanism connected to electric motors M fed feed by a power supply such as a battery B contained in the vehicle.

During the inspection trip, the light sources 49, 50 illuminate the pipe section of the pipeline 4 which is ahead of the inspection vehicle. The pictures of the illuminated pipe section which is ahead of the inspection vehicle taken by the television camera, are recorded together with data regarding the distance travelled, by a video recorder installed in the vehicle body 7. The distance travelled by the inspection vehicle is recorded by a distance feeler wheel DF coupled to one of the wheels. As a result, defects discovered by the evaluation of the video tape can be localized by the indication of the distance travelled to that point. It thereby becomes possible to replace damaged pipe sections in a targeted manner later on.

If any obstacles are in the pipe which could interfere with the further movement of the inspection vehicle, they move the shut-off frame 45 when hitting the pipe stub 47 and thus trigger the reversal of the travel direction of the inspection vehicle. This prevents the inspection vehicle from running into obstacles and getting jammed in the pipe, when left alone. As an additional protective measure, photo detector housings 51, 52 are mounted on the shut-off frame 45. It can be seen from the one field of view shown, that the fields of view of the photo detectors are directed toward the inside wall surface of the pipeline immediately ahead of the inspection vehicle. In this way, a different reflection behavior is also utilized as a switch reversal criterion for the direction of travel, in addition to the mechanical scanning of obstacles by the shut-off frame. For instance, if the inspection vehicle approaches a T-section or an opening in the vessel, the reflection signal of one of the photo detectors is suddenly missing. This triggers a reversal of the propulsion direction, so that the inspection vehicle is prevented from falling into the vessel or the T-section.

During the return trip of the inspection vehicle, the vehicle runs backwards until the buffer 60 located at the rear end face 57 hits a shut-off slider 6 of the pipe lock 2 and thereby turns itself off. The inspection vehicle 1 can then be removed from the pipe lock 2 and the result of the inspection, i.e. the television pictures of the inspection trip recorded by a video recorder V, can be evaluated quietly at a desk with a video monitor. During the inspection of relatively short line sections, the inspection vehicle can also be directly connected to a television set through a signal cable. In this case, the inspection trip can be followed "live", so to speak, and control commands can also be executed. This signal cable can also be made thinner and lighter than a power supply cable. Since the vehicle body is water-tight, inspection trips can also be made in pipeline sections whic than a power supply cable. Since the vehicle body is water-tight, inspection trips can also be made in pipeline sections which are under water and therefore do not have to be emptied.

Figure 2:
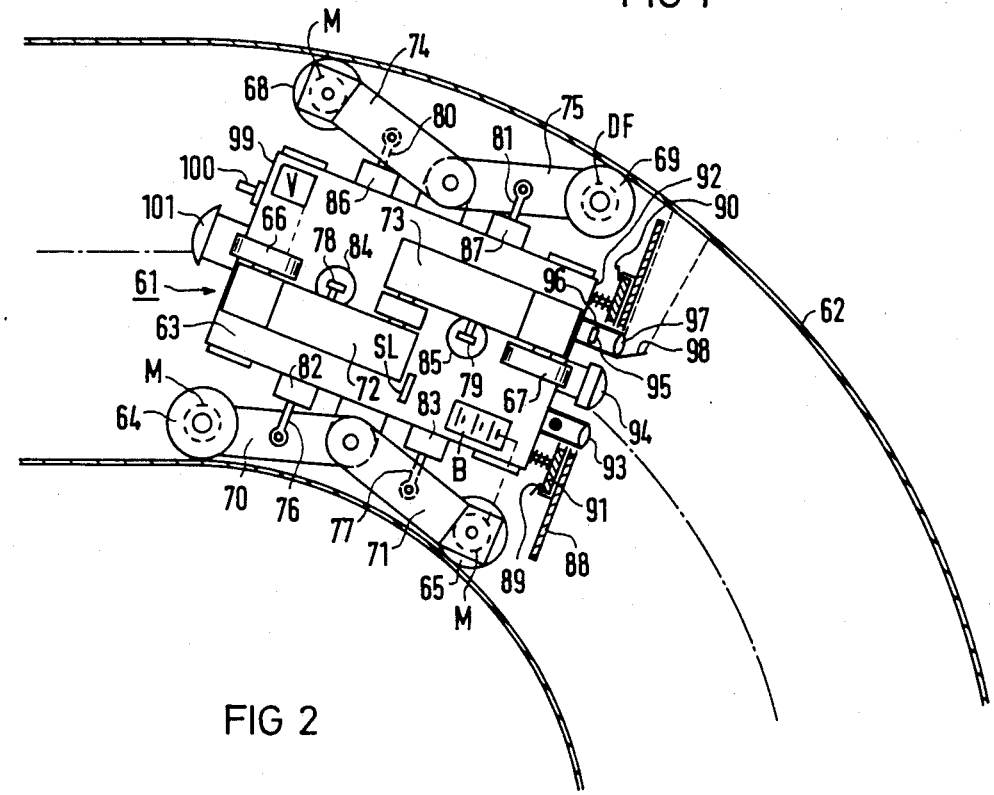
FIG. 2 is a view similar to FIG. 1 of another inspection vehicle according to the invention, which is negotiating a pipe elbow.

In FIG. 2, a different inspection vehicle according to the invention is shown as it is negotiating a pipe elbow 62. In this case as well, a cylindrical vehicle body 63 of a vehicle 61 is braced against the inside wall surface of the pipe by wheels. 64 to 69. These wheels are each supported in the same way at the free end of a spring or shock absorbing strut or leg 70 to 75, as was described with the aid of the embodiment of FIG. 1. Each shock absorbing leg is coupled to a respective piston rod 76 to 81 of a respective power cylinder 82 to 87. The shock absorbing legs and therefore the wheels are each pressed against the inside wall surface of the pipe by a respective spring which is contained in the interior of the vehicle body 63 and is coupled to a respective piston rod 76 to 81 of a respective power cylinder 82 to 87. In contrast to the embodiment of FIG. 1, a shut-off frame 88 is provided in the FIG. 2 embodiment which is only a ring washer. The shut-off frame 88 can be plugged on a support ring 91 by means of resilient holding brackets 89, 90. The support ring 91 is in turn resiliently supported at the forward end face 92 of the vehicle body 63 and is coupled to a non-lilustrated reversing device for the propulsion direction of the wheels.

A light source 92, only one of which is shown, for illuminating the pipeline, as well as an optical system 94 for a non-illustrated television camera and photo detectors 95, only one of which is shown, are brought through a central opening formed in the shut-off frame 88. Housings 96 for the photo detectors 95 are alternated with the light sources 93 about the centrally disposed optical system 94 for the television camera. Besides the photo detector, the housings 96 also contain a lens 97 and a mirror 98 which direct the field of view of the photo detectors toward the wall zones immediately ahead of the inspection vehicle 61.

The advantage of this construction over the embodiment of FIG. 1 is that, depending on the inside diameter of the pipe to be inspected, simple shut-off frames 88 of different outside diameter can be plugged on to the support ring 91. Retrofitting for another pipe diameter is therefore simple. This inspection vehicle is also equipped at the rearward end face 99 thereof with a connecting stub 100 for compressed air which is used for applying the shock absorbing struts or legs against the vehicle body 63, and it is also provided with a buffer 101 for shutting off the inspection vehicle. Otherwise, this inspection vehicle has the same advantages which were already described in connection with the embodiment of FIG. 1. FIG. 2 also shows a water-tight motor M for the drive wheel 65 of a propulsion mechanism 64–75. The motor M is connected to a battery B. A common motor can also drive two or more wheel through a suitable transmission. One of the wheels may be a non-driven feeler.

The shut-off frame 45, 88 can also be omitted. However, the light sources 49, 50, the photo detector housings 51, 52, the aperture ring 55 and the optical system, must then be fastened directly to the forward end face of the vehicle body 7, as seen in the direction of travel. Instead of the buffer 60, 101, a manually operable switch for the propulsion of the inspection and repair vehicle 1, 61 can also be provided. It would also be possible to assign a separate propulsion motor to each driven wheel and to support this propulsion unit formed of a drive wheel and the drive motor, in such a way as to be movable along a guide aligned radially relative to the vehicle body and to push it away from the vehicle body with at least one spring.

We claim:

1. Self-propelled inspection vehicle for piping systems, comprising a vehicle body in the form of a rigid, tightly-sealed housing having forward and rearward end faces as seen in a given insertion direction of the vehicle into the piping, a power supply disposed in said housing, a propulsion mechanism for resiliently bracing said housing against the inner surface of the piping, at least one motor connected to said power supply and to said propulsion mechanism for driving said propulsion mechanism, a television camera optical system having a given field of view being supported on said forward end face of said housing, at least one light source associated with said given field of view being supported on said forward end face of said housing, at least one sensor connected to said housing for detecting obstacles, and a switching device connected to said sensor for reversing propulsion direction of the vehicle.

2. Self-propelled vehicle according to claim 1, wherein said housing has an axis of symmetry aligned with the axis of the piping, and said propulsion mechanism includes at least three wheels mutually offset by at most 120° about said axis of symmetry near its forward and near its rearward faces.

3. Self-propelled vehicle according to claim 2, wherein said propulsion mechanism includes shock-absorbing struts each having an end connected to a respective one end of said wheels.

4. Self-propelled vehicle according to claim 3, wherein said propulsion mechanism includes springs, at least one of said springs pressing each respective strut toward the inner surface of the piping.

5. Self-propelled vehicle according to claim 3, including at least one power cylinder connected to said struts for retracting said struts from the inner surface of the piping for insertion into a pipe end.

6. Self-propelled vehicle according to claim 1, wherein said power supply is a battery.

7. Self-propelled vehicle according to claim 1, including a video recorder disposed in said housing and connected to said television camera optical system.

8. Self-propelled vehicle according to claim 1, including a signal cable connected to said housing for transmitting data.

9. Self-propelled vehicle according to claim 1, including detectors disposed on said foward end face of said housing being matched to said light source and aligned with a pipe wall illuminated by said light source for timely detection of substantial cross-sectional changes in the pipe wall.

10. Self-propelled inspection vehicle according to claim 9, including means connected to said detectors for reversing direction of the vehicle.

11. Self-propelled vehicle according to claim 1, including a control logic for reversing direction of propulsion of the vehicle upon excessive current consumption by said motor.

12. Self-propelled vehicle according to claim 1, wherein said propulsion mechanism includes drive wheels being radially movably supported on said vehicle body together with said motor.

13. Self-propelled inspection vehicle for piping systems, comprising a vehicle body in the form of a rigid, tightly-sealed housing having forward and rearward end faces as seen in a given insertion direction of the vehicle into the piping, a power supply disposed in said housing, a propulsion mechanism for resiliently bracing said housing against the inner surface of the piping, at least one motor connected to said power supply and to said propulsion mechanism for driving said propulsion mechanism, a television camera optical system having a given field of view being supported on said forward end face of said housing, at least one light source associated with said given field of view being supported on said forward end face of said housing, said propulsion mechanism including a plurality of driven wheels and a non-driven distance feeler wheel, and said at least one motor being in the form of a plurality of motors each being connected to a respective one of said driven wheels.

14. Self-propelled vehicle according to claim 13, wherein said distance feeler wheel runs freely on the inner surface of the piping, and including a rotary pickup coupled to said distance feeler wheel as a measuring sensor.

15. Self-propelled vehicle according to claim 14, including an axle carrier, a photo detector fastened to said axle carrier along with and in mutual alignment with said light source, and a disc having cutouts formed therein being coupled to said freely running wheel and rotatable between said photo detector and said light source.

16. Self-propelled inspection vehicle for piping systems, comprising a vehicle body in the form of a rigid, tightly-sealed housing having forward and rearward end faces as seen in a given insertion direction of the vehicle into the piping, a power supply disposed in said housing, a propulsion mechanism for resiliently bracing said housing against the inner surface of the piping, at least one motor connected to said power supply and to said propulsion mechanism for driving said propulsion mechanism, a television camera optical system having a given field of view being supported on said forward end face of said housing, at least one light source associated with said given field of view being supported on said forward end face of said housing, and at lesat one sensor connected to said housing for detecting obstacles.

17. Self-propelled vehicle according to claim 16, wherein said housing has an axis of symmetry, and said sensor is a shut-off frame having an outer contour disposed several millimeters from the inner surface of the piping, said shut-off frame being supported on said forward end face perpendicular to said axis of symmetry and resilient in direction along said axis of symmetry.

18. Self-propelled vehicle according to claim 16, wherein said sensor includes an acoustical transmitting and receiving system.

19. Self-propelled inspection vehicle for piping systems, comprising a vehicle body in the form of a rigid, tightly-sealed housing having forward and rearward end faces as seen in a given insertion direction of the vehicle into the piping, a power supply disposed in said housing, a propulsion mechanism for resiliently bracing said housing against the inner surface of the piping, at least one motor connected to said power supply and to said propulsion mechanism for driving said propulsion mechanism, a television camera optical system having a given field of view being supported on said forward end face of said housing, at lesat one light source associated with said given field of view being supported on said forward end face of said housing, said propulsion mechanism including a plurality of driven wheels and a non-driven distance feeler wheel, said distance feeler wheel running on the inner surface of the piping and including a rotary pick-up for recording at least one of the motion of the vehicle and the distance travelled, to be stored synchronously with a television picture, means for fading the recorded information into a television picture, and a switching logic connected to said rotary pick-up for reversing direction of propulsion of the vehicle upon the occurrence of a forced stop.

20. Self-propelled inspection vehicle for piping systems, comprising a vehicle body in the form of a rigid, tightly-sealed housing having forward and rearward end faces as seen in a given insertion direction of the vehicle into the piping, a power supply disposed in said housing, a propulsion mechanism for resiliently bracing said housing against the inner surface of the piping, at least one motor connected to said power supply and to said propulsion mechanism for driving said propulsion mechanism, a television camera optical system having a given field of view being supported on said forward end face of said housing, at least one light source associated with said given field of view being supported on said forward end face of said housing, and means in the form of a radio isotope disposed on said housing for localizing the position of the vehicle in the piping from outside the piping.

* * * * *